United States Patent
Low et al.

(10) Patent No.: US 6,667,015 B1
(45) Date of Patent: Dec. 23, 2003

(54) APPARATUS AND METHOD FOR EXTRACTING BIOMASS

(75) Inventors: Robert E. Low, Northwich (GB); Stuart Corr, Warrington (GB); Frederick Thomas Murphy, Frodsham (GB); James David Morrison, Northwich (GB)

(73) Assignee: Ineos Fluor Holdings Limited (GB)

( * ) Notice: Subject to any disclaimer, the term of this patent is extended or adjusted under 35 U.S.C. 154(b) by 460 days.

(21) Appl. No.: 09/655,631

(22) Filed: Sep. 5, 2000

(30) Foreign Application Priority Data

Sep. 6, 1999 (GB) ................................................ 9920946

(51) Int. Cl.⁷ ............................................... B01D 11/02
(52) U.S. Cl. ........................ 422/281; 422/261; 422/278; 554/12
(58) Field of Search ................................ 422/281, 261, 422/278; 554/12

(56) References Cited

U.S. PATENT DOCUMENTS 3,612,066 A 10/1971 Jones et al.
4,278,012 A 7/1981 Wheldon et al.
5,516,923 A 5/1996 Hebert et al.

FOREIGN PATENT DOCUMENTS

| CA | WO 1 130 988 | 9/1982 |
|---|---|---|
| DE | 28 44 781 | 4/1980 |
| EP | 0 061 877 A2 | 10/1982 |
| EP | PCT/GB 00/03341 | 1/2000 |
| FR | 2 350 126 | 12/1977 |
| GB | 1388581 | 3/1975 |
| GB | 2 288 552 A | 10/1995 |
| GB | 2320025 | 6/1998 |
| GB | 0020998.1 | 12/2000 |
| WO | WO 94/20486 | 9/1994 |
| WO | WO 95/26794 | 10/1995 |
| WO | WO 00/64555 | 11/2000 |

Primary Examiner—Krisanne Thornton
(74) Attorney, Agent, or Firm—Cook, Alex, McFarron, Manzo, Cummings & Mehler, Ltd.

(57) ABSTRACT

An apparatus for extracting biomass includes a closed loop circuit having an extraction vessel (11), an evaporator (12), a compressor (13), a condenser (14) and (optionally) a storage reservoir (15) operatively connected in series. A pumped recirculation loop (20) recirculates a portion of the output of the extraction vessel (11) for further contact with biomass. One or more modifiable resistances to flow (12;23) control the flow of solvent around the recirculation loop (20) and the main closed loop.

21 Claims, 2 Drawing Sheets

APPARATUS AND METHOD FOR EXTRACTING BIOMASS

This invention concerns apparatuses and a method for "extraction" of biomass, i.e. the extraction of flavours, fragrances or pharmaceutically active ingredients from materials of natural origin (these materials being referred to as "biomass" herein).

Examples of biomass materials include but are not limited to flavoursome or aromatic substances such as coriander, cloves, star anise, coffee, orange juice, fennel seeds, cumin, ginger and other kinds of bark, leaves, flowers, fruit, roots, rhizomes and seeds. Biomass may also be extracted in the form of biologically active substances such as pesticides and pharmaceutically active substances or precursors thereto, obtainable e.g. from plant material, a cell culture or a fermentation broth.

There is growing technical and commercial interest in using near-critical solvents in such extraction processes. Examples of such solvents include liquefied carbon dioxide or, of particular interest, a family of chlorine-free solvents based on organic hydrofluorocarbon (HFC) species.

By the term "hydrofluorocarbon" we are referring to materials which contain carbon, hydrogen and fluorine atoms only and which are thus chlorine-free.

Preferred hydrofluorocarbons are the hydrofluoroalkanes and particularly the $C_{1-4}$ bhydrofluoroalkanes. Suitable examples of $C_{1-4}$ hydrofluoroalkanes which may be used as solvents include, inter alia, trifluoromethane (R-23), fluoromethane (R-41), difluoromethane (R-32), pentafluoroethane (R-125), 1,1,1-trifluoroetane (R-143a), 1,1,2,2-tetrafluoroethane (R-134), 1,1,1,2-tetrafluoroethane (R-134a), 1,1-difluoroethane (R-152a), heptafluoropropanes and particularly 1,1,1,2,3,3,3-heptafluoropropane (R-227ea), 1,1,1,2,3,3-hexafluoropropane (R-236ea), 1,1,1,2,2,3-hexafluoropropane (R-236cb), 1,1,1,3,3,3-hexafluoropropane (R-236fa), 1,1,1,3,3-pentafluoropropane (R-245fa), 1,1,2,2,3-pentafluoropropane (R-245ca), 1,1,1,2,3-pentafluoropropane (R-245eb), 1,1,2,3,3-pentafluoropropane (R-245ea) and 1,1,1,3,3-pentafluorobutane (R-365mfc). Mixtures of two or more hydrofluorocarbons may be used if desired.

R-134a, R-227ca, R-32, R-125, R-245ca and R-245fa are preferred.

An especially preferred hydrofluorocarbon for use in the present invention is 1,1,1,2-tetrafluoroethane (R-134a).

It is possible to carry out biomass extraction using other solvents such as chlorofluorocarbons ("CFC's") or hydrochlorofluorocarbons ("HCFC's"), and/or mixtures of solvents.

Known extraction processes using these solvents are normally carried out in closed-loop extraction equipment. A typical example 10 of such a system is shown schematically in FIG. 1.

In this typical system 10, liquefied solvent is allowed to percolate by gravity in downflow through a bed of biomass held in vessel 11. Thence it flows to evaporator 12 where the volatile solvent vapour is vaporised by heat exchange with a hot fluid. The vapour from evaporator 12 is then compressed by compressor 13: the compressed vapour is next fed to a condenser 14 where it is liquefied by heat exchange with a cold fluid. The liquefied solvent is then optionally collected in intermediate storage vessel 15 or returned directly to the extraction vessel 1 to complete the circuit.

A feature of this process is that the principal driving force for circulation of solvent through the biomass and around the system is the difference in pressure between the condenser/storage vessel and the evaporator. This difference in pressure is generated by the compressor. Thus to increase the solvent circulation rate through the biomass it is necessary to increase this pressure difference, requiring a larger and more powerful compressor.

The large difference in solvent liquid and vapour densities means that a modest increase in liquid circulation rate can require significant additional capital and operating cost. This is because any vapour volumetric flow increase requires an increase in compressor size. This means that the system designer has to compromise between the rate at which liquid can be made to flow through the biomass and the rate at which vapour can be compressed.

The purchase cost and, perhaps more significantly, the operating cost of a compressor increase with increasing size. Also many biomass extraction apparatuses are constituted as approximately room-sized plant or smaller, in which there is limited scope for simply increasing the size of the compressor.

A potential problem for efficient design of equipment arises because it is known that, for most extractions, the rate at which the majority of the extract material is removed from the biomass is influenced by the rate at which solvent flows through the bed. A faster solvent rate gives better mass transfer from the biomass to the solvent, enabling more material to be removed for a given period of time. Consequently the size of compressor 13 selected for the apparatus 10 ultimately determines the rate at which the material may be extracted and therefore affects the time taken to effect an extraction.

Equipment designed for this type of extraction process is typically used for multiple extractions of different biomasses, yielding a range of products which may need to be extracted to meet a variety of customers' production schedules. The biomasses of interest to industry can range from relatively large, pellet-like seeds or beans, to much finer powdered or shredded vegetation.

The smaller the particle size of a bed of biomass the greater its resistance to liquid flow. Consequently with a fixed size of solvent vapour compressor the speed at which an extraction plant of this design can process a range of materials will vary widely (hence affecting batch extraction time) and may therefore compromise the overall economic performance of the plant or its liability to meet external scheduling demands.

Another potential problem with the FIG. 1 arrangement is the existence of a vapour/liquid interface at the top of the biomass bed in the extractor vessel 11. This means that the solvent flowing through the bed is essentially saturated liquid. In other words, it is close to boiling. This means that, if its pressure is reduced, a portion of the liquid flowing through the bed will vaporize even in the absence of external heat input. A packed bed of biomass can offer a significant resistance to flow. Thus it is possible to conceive of a critical rate of flow at which the pressure loss caused by flow through the bed offsets the hydrostatic head gained as the liquid flows down through the bed. As flow increases beyond this value, vapour bubbles will form in the liquid flowing through the system toward the evaporator. This is a form of flash vaporization of the solvent/extract mixture.

Therefore any reduction in compressor suction pressure (i.e. at the intake side of the compressor), effected with the intention of increasing the circulation rate, can have only limited success because the solvent flowing out of the bed will eventually form a mixture of liquid and vapour, with an effective density significantly lower than that of the liquid solvent.

The frictional resistance to flow in any fluid system increases as effective density of the fluid decreases. The presence of vapour arising from a pressure drop as described above will eventually cause sufficient increase in frictional resistance to flow to offset an increased pressure difference over the compressor and will therefore negate any further benefit to reducing the compressor suction pressure. The maximum liquid throughput of the system is therefore additionally constrained by this design of equipment.

For these reasons, simply increasing the compressor size is of limited benefit in improving efficiency of the biomass extraction Heat recovery is often employed in such processes to reduce the cost of operating the process. This can be achieved by either of two methods: direct or indirect heat integration. In the former, the solvent condenser 14 is combined with the solvent evaporator 12. The hot, compressed solvent vapour is condensed in this unit and acts as the hot fluid for the vaporization of solvent in the evaporator. In the latter method a portion of the flow of heated cooling medium (typically water) from the condenser 14 is used to supply heat to the solvent evaporator.

In either case of heat recovery the solvent circuit acts as a vapour compression heat pump. The thermodynamic efficiency of such a device is inversely proportional to the difference between vaporization and condensation temperature of the working fluid. This means in practice that the work (power) required to drive the system by the compressor increases as the difference between vaporisatiou and condensation temperatures increases. Thus, since vaporization pressure of a solvent is determined uniquely by its temperature, any deliberate increase in pressure difference over the compressor, effected to increase solvent circulation rate, will increase the power consumption of the compressor and therefore will increase the operating cost of the system.

In other words, the known methods of heat recovery lead to significantly increased operating costs when the compressor is ran faster, increased in size or run at a higher pressure difference in an attempt to improve rates of biomass extraction.

There is a further problem associated with the known apparatus shown in FIG. 1. This is that, in use, the biomass is not packed tightly into the extractor and is therefore free to float. The bulk density of biomass typically is 55%–75% of the solvent liquid density. There is also a small clearance gap between the biomass and the wall of the extraction vessel 11. Some of the solvent therefore flows preferentially around the side of the bed, through the annular gap between the bed and the wall.

Even a small (such as a 2 mm) gap can cause a significant proportion of the flow to bypass the bed. The effect of this is to increase the contact time of the solvent needed to extract a given quantity of biomass and therefore to increase the time required to extract the material.

The invention seeks to solve or at least ameliorate one or more of the drawbacks of the prior art. According to a first aspect of the invention there is provided an apparatus for extracting biomass, comprising a closed loop circuit including, operatively connected in series, an extraction vessel for containing biomass that Permits a solvent or a solvent mixture to contact the biomass to effect extraction; an evaporator for separating solvent and biomass extract from one another; a compressor for compressing gaseous solvent; and a condenser for condensing pressurized solvent for return to the extraction vessel; and wherein the circuit includes a pumped recirculation loop for recirculating a portion of the output of the extraction vessel for further contact with biomass; and one or more modifiable resistances to flow in the solvent circuit.

This arrangement advantageously allows variation of the liquid circulation rate through the biomass being extracted in a closed-loop solvent extraction circuit of the general functionality defined above, without need to alter the size or operating conditions of a solvent vapour- compressor.

Preferably the extraction vessel contains a packed bed of biomass.

The designer can therefore select an operating condition for the compressor and associated evaporator and condenser which gives an optimum operating condition by e.g. using a minimal pressure difference between condenser and evaporator.

The pump eliminates the possibility of a vapour gap in the extractor vessel and provides sufficient pressure to eliminate the potential problems of flash vapour mentioned above.

In a preferred embodiment of a circuit embodying the invention the pumped recirculation loop includes a recirculation line, branched from a solvent/extract delivery line connected to the evaporator the pumped recirculation line being connected to the extraction vessel and wherein the pumped recirculation loop includes in series a said modifiable resistance to flow, and a liquid pump.

In another preferred embodiment of a circuit embodying the invention a solvent/extract delivery line is connected to the evaporator and includes in line a said modifiable resistance.

Preferred kinds of modifiable resistance to flow are or include an adjustable flow control valve or an orifice plate, the orifice plate being removably secured in the recirculation loop to permit its replacement by a plate having a different orifice.

Preferred control arrangements for the modifiable resistances are or include an adjustable flow control valve and wherein the or each modifiable resistance is operable under the control of an electronic or computer controller.

Conveniently the apparatus may include a solvent storage vessel having an inlet and an outlet and being connected in parallel with the solvent recirculation loop. More particularly the solvent storage vessel is connected in-line between the condenser and the extraction vessel.

Preferably the recirculation pump pumps recirculated solvent upwards through a bed of biomass in the extraction vessel. Alternatively, the recirculation pump pumps recirculated solvent downwards through a bed of biomass in the extraction vessel. It is believed that other directions of solvent flow are possible.

According to a second aspect of the invention there is provided an apparatus for extracting biomass, comprising a closed loop circuit including, connected in series, an extraction vessel for containing biomass that permits solvent to contact the biomass to effect extraction; an evaporator for separating biomass extract and solvent from one another; a compressor for compressing gaseous solvent; and a condenser for condensing pressurized solvent for return to the extraction vessel, wherein the extraction vessel contains a packed bed of biomass occupying substantially entirely the cross-section of a part of the extraction vessel in which the solvent contacts the biomass. This apparatus is particularly suited to form part of the apparatus, wherein the circuit includes a pumped recirculation loop for recirculating a portion of the output of the extraction vessel for further contact with biomass; and one or more modifiable resistances to flow in the solvent circuit, which for the first time allows use of a packed biomass bed.

Preferably the density of biomass in the packed bed is in the range of 750 kg/m³–1000 kg/m³.

According to a third aspect of the invention there is provided a method of extracting biomass comprising the steps of: placing a packed bed of biomass in the extraction vessel of a closed loop apparatus having operatively connected in series, an extraction vessel for containing biomass that permits a solvent or a solvent mixture to contact biomass to effect extraction; an evaporator for separating solvent and biomass extract from one another; a compressor for compressing gaseous solvent; and a condenser for condensing pressurized solvent for return to the extraction vessel; operating the compressor to draw solvent and biomass extract entrained therewith from the extraction vessel into the closed loop; operating the evaporator and condenser; and controlling the flow rate of the solvent around the closed loop.

This method may advantageously be practiced using the apparatus as described above.

Preferred features of the inventive method include the step of controlling the flow rate of solvent includes recirculating a quantity of solvent tanned from a point in the closed loop between the extraction vessel and the compressor to the extraction vessel for further contact with the biomass; and controlling one or more modifiable resistances to solvent flow in the closed loop. The step of recirculating a quantity of solvent may include pumping the quantity around a recirculation loop and through a packed bed of biomass so that the solvent contacts the biomass. The step of controlling one or more modifiable resistances includes adjusting an adjustable flow control valve and/or installation of an orifice plate assembly or a plurality of such slates in series.

There now follows a description of preferred embodiments of the invention, by way of non-limiting example, with reference being made to the accompanying drawings in which.

Figure 1:
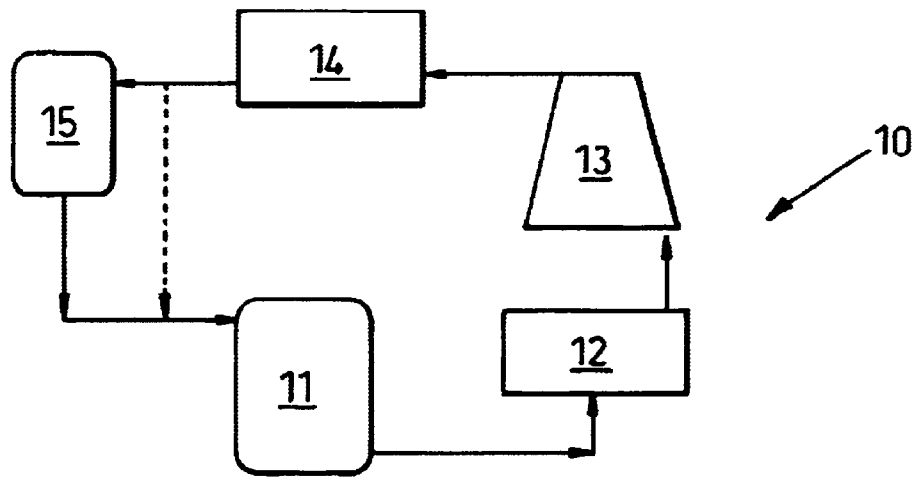
FIG. 1 is a schematic representation of a prior art closed loop biomass extraction apparatus.
Figure 2:
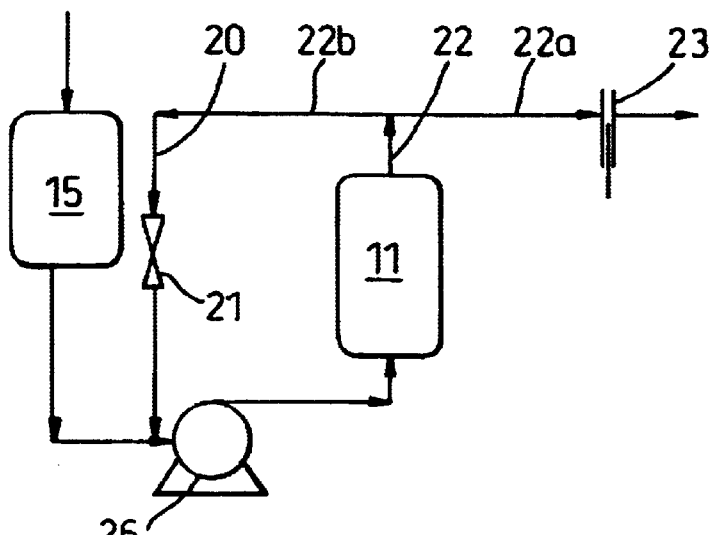
FIG. 2 is a schematic representation of a first embodiment of apparatus according to the invention.

Referring to FIG. 2 there is shown a part of the FIG. 1 circuit, modified in accordance with the invention. The remainder of the circuit part illustrated in FIG. 2 is as shown in FIG. 1.

Thus the complete apparatus, part of which is visible in FIG. 2, includes operatively connected in series, an., extraction vessel 11, for containing biomass, that permits a solvent or a solvent mixture to contact biomass to effect extraction; an evaporator for separating solvent and biomass extract from one another; (optionally) a compressor for compressing gaseous solvent; and a condenser for condensing pressurized solvent for return to the extraction vessel. FIG. 2 also includes the receiver 15 that is optional in the FIG. 1 arrangement.

FIG. 2 shows a pumped recirculation loop 20 for recirculating a portion of the output of the extraction vessel 11 for further contact with the biomass; and modifiable flow resistances, in the form of flow control valve 21 and flow restrictor 23.

Describing the FIG. 2 apparatus in more detail, the solvent/extract liquor delivery line 22, that in the FIG. 1 embodiment connects directly to the evaporator 12, branches a short distance from the outlet side of the extraction vessel 11.

A main branch 22a of the delivery line connects to the evaporator 12 and includes an in line flow restrictor such as a nozzle or, as shown, an orifice plate 23.

A recirculation branch 22b of the delivery line, that conveys solvent that has contacted the biomass and biomass extract entrained therewith, is connected to the inlet side of the extraction vessel 11.

Recirculation branch 22b includes, operatively connected in series, adjustable flow control valve 21 and pump 26. The output of pump 26 connects directly to the inlet side of extraction vessel 11.

The outlet of receiver 15 is, in parallel to recirculation branch 22b, connected as an additional input to pump 26. incorporated in the delivery line to aid the balancing of flow resistance in the delivery and recirculation lines.

In use of the FIG. 2 apparatus solvent from the receiver or storage vessel 15 is circulated through the extraction vessel 11 by solvent circulation pump 26. Flow control valve 21 in the solvent recirculation line 22b is controlled (e.g. electronically or using a computer) to allow a portion of the solvent liquor to return to the suction side of the pump while the balance of the solvent flow is allowed to feed forward through delivery line 22a to the solvent evaporation stage of the process. Orifice plate 23 is optionally incorporated in the delivery line to aid the balancing of flow resistance in the delivery and recirculation lines.

Figure 3:
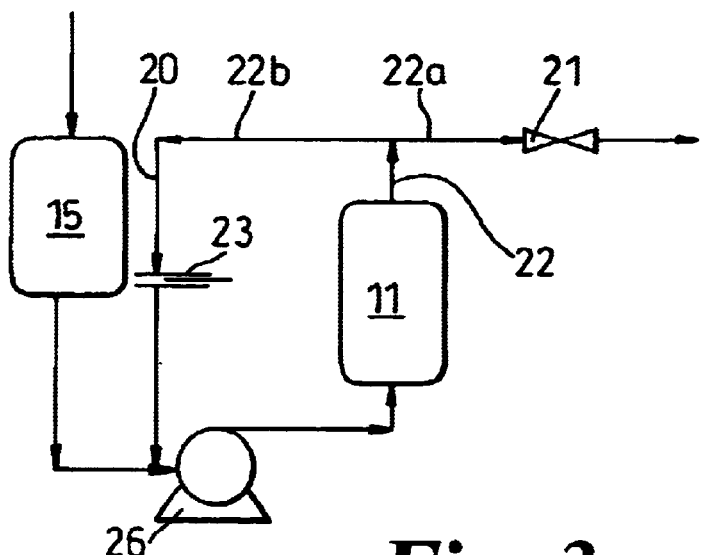
FIG. 3 is a schematic representation of a second embodiment of apparatus according to the invention.

FIG. 3 shows a second embodiment of the invention. The embodiment is the same as the FIG. 2 embodiment, except that the adjustable valve 21 and orifice 23 are transposed. In operation the adjustable valve 21 acts to control the quantity of solvent liquor that is fed forward to the evaporator 12, rather than controlling the amount of solvent/extract liquor that enters the recirculation branch line 22b. Nonetheless the effect remains that of controlling the flow rate of solvent around the closed loop 20.

Figure 4:
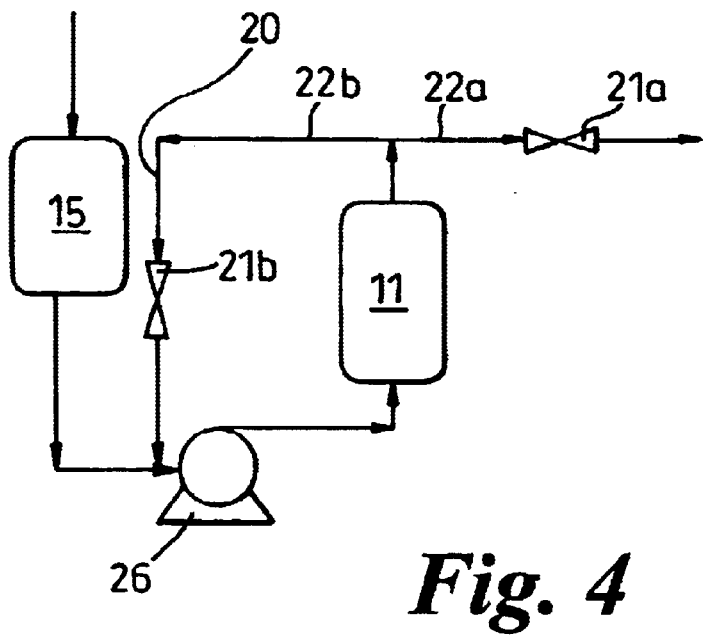
FIG. 4 is a schematic representation of a third embodiment of apparatus according to the invention.

A third embodiment of the invention is shown in FIG. 4. In this embodiment, adjustable flow control valves 21a, 21b are present in both the recirculation and delivery lines 22b, 22a. In use this allows continuous control of both the solvent rate through the biomass and the liquid level in the receiver 15. The recirculation line valve 21b is used to set total flow while the valve 21a on the delivery line 22a is used to control liquid level (and hence system solvent mass balance). This principle can readily be extended to control the level in the solvent condenser rather than in the solvent receiver if so desired.

In all of the embodiments of the invention the basic principle remains that of pumped recirculation of the solvent. This means that the solvent entering the bed will necessarily have a finite concentration of extracted material within it. The effect of this is admittedly to reduce the driving force for mass transfer between biomass surface and the solvent. It might therefore be thought that this would hinder rather than help extraction.

It is however known that typical solvent rates used in equipment without forced recirculation are low because the flow regime attained is typically laminar and often close to creeping flow. Under this kind of flow regime the mass transfer rates attained are so low that, for typical contact times used, the solvent leaves the bed with only a small fraction of the saturation solubility of the extract material. In addition the solvent velocity profile will vary across the diameter of the bed and so the efficacy of contacting must vary across the diameter of the bed.

There is therefore potential to increase the overall extraction rate by using the recirculation pump. This forces a turbulent flow regime in the extraction vessel. As the degree of turbulence increases the velocity profile across the diameter of the bed becomes near-uniform and additionally the local rate of mass transfer is increased. These effects increase the average (overall) rate of extraction attained in the extractor vessel.

The invention reduces the driving force (concentration difference) available for mass transfer and so as the extraction proceeds, depending on process economics for a given biomass, it may be beneficial to continuously alter the recirculation rate so that an optimal overall rate of extraction is attained. Such alteration could be carried out manually or under automatic control.

SUMMARY OF MAIN ADVANTAGES OF THE INVENTION

The invention relates to biomass extractions performed using a closed loop process of the general type displayed in FIG. 1.

It allows independent variation of the rate of circulation of solvent through the biomass without increasing the size of solvent vapour compressor required.

It allows operation of a closed-loop extraction system with minimal difference in operating pressure between the solvent evaporator and solvent condenser, which is beneficial for capital cost of the compressor and also for the variable cost of operating the process.

It removes the potential of vapour formation in the bed and therefore removes a potential limit to solvent circulation rates It affords greater control over the inventory of solvent in an extraction system and therefore reduces the amount of manual intervention required during an extraction.

What is claimed is:

1. Apparatus for extracting biomass, comprising a closed loop circuit including, operatively connected in series, an extraction vessel, for containing biomass, that permits a solvent or a solvent mixture to contact biomass to effect extraction;

an evaporator for separating solvent and biomass extract from one another;

a compressor for compressing gaseous solvent; and a condenser for condensing pressurized solvent for return to the extraction vessel, wherein the circuit includes a pumped recirculation loop for recirculating a portion of the output of the extraction vessel for further contact with biomass; and one or more modifiable resistances to flow in the solvent circuit.

2. Apparatus according to claim 1 wherein the extraction vessel contains a packed bed of biomass.

3. Apparatus according to claim 1 wherein the pumped recirculation loop includes a recirculation line, branched from a solvent/extract delivery line connected to the evaporator, the pumped recirculation line being connected to the extraction vessel and wherein the pumped recirculation loop includes in series a said modifiable resistance to flow, and a liquid pump.

4. Apparatus according to claim 1 wherein the pumped recirculation loop includes a recirculation line, branched from a solvent/extract delivery line connected to the evaporator, the pumped recirculation line being connected to the extraction vessel and wherein the pumped recirculation loop includes in series a said modifiable resistance to flow, and a liquid pump, and wherein the modifiable resistance is or includes an adjustable flow control valve.

5. Apparatus according to claim 1 wherein the pumped recirculation loop includes a recirculation line, branched from a solvent/extract delivery line connected to the evaporator, the pumped recirculation line being connected to the extraction vessel and wherein the pumped recirculation loop includes in series a said modifiable resistance to flow, and a liquid pump, and wherein the modifiable resistance is or includes an orifice plate, the orifice plate being removably secured in the recirculation loop to permit its replacement by a plate having a different orifice.

6. Apparatus according to claim 1 including a solvent/extract delivery line connected to the evaporator and including in the line a said modifiable resistance.

7. Apparatus according to claim 1 including a solvent/extract delivery line connected to the evaporator and including in the line a said modifiable resistance and wherein the modifiable resistance is or includes an adjustable flow control valve.

8. Apparatus according to claim 1 including a solvent/extract delivery line connected to the evaporator and including in the line a said modifiable resistance and wherein the modifiable resistance is or includes an orifice plate, the orifice plate being removably secured in the solvent/extract delivery line to permit its replacement by a plate having a different orifice.

9. Apparatus according to claim 1, wherein the pumped recirculation loop includes a recirculation line, branched from a solvent/extract delivery line connected to the evaporator, the pumped recirculation line being connected to the extraction vessel and wherein the pumped recirculation loop includes in series a said modifiable resistance to flow, and a liquid pump and wherein the modifiable resistance is or includes an adjustable flow control valve and wherein the or each modifiable resistance is operable under the control of an electronic or computer controller.

10. Apparatus according to claim 1 including a solvent storage vessel having an inlet and an outlet and being connected in parallel with the solvent recirculation loop.

11. Apparatus according to claim 1 including a solvent storage vessel having an inlet and an outlet and being connected in parallel with the solvent recirculation loop wherein the solvent storage vessel is connected in line between the condenser and the extraction vessel.

12. Apparatus according to claim 1 wherein the recirculation pump pumps recirculated solvent upwards through a bed of biomass in the extraction vessel.

13. Apparatus according to claim 1 wherein the recirculation pump pumps recirculated solvent downwards through a bed of biomass in the extraction vessel.

14. Apparatus for extracting biomass, comprising a closed loop circuit including, connected in series, an extraction vessel, for containing biomass, that permits solvent to contact the biomass to effect extraction;

an evaporator for separating biomass extract and solvent from one another;

a compressor for compressing gaseous solvent;

a condenser for condensing pressurized solvent for return to the extraction vessel, wherein the extraction vessel contains a packed bed of biomass occupying substantially entirely the cross-section of a part of the extraction vessel in which the solvent contacts the biomass, and one or more modifiable resistances to flow in the closed loop circuit.

15. Apparatus according to claim 14 wherein the density of biomass in the packed bed is in the range of 750 kg/m$^3$–1000 kg/m$^3$.

16. A method of extracting biomass comprising the steps of:
placing a packed bed of biomass in the extraction vessel of a closed loop apparatus having, operatively connected in series,
an extraction vessel, for containing biomass, that permits a solvent or a solvent mixture to contact biomass to effect extraction;
an evaporator for separating solvent and biomass extract from one another;
a compressor for compressing gaseous solvent; and
a condenser for condensing pressurized solvent for return to the extraction vessel,
operating the compressor to draw solvent and biomass extract entrained therewith from the extraction vessel into the closed loop;
operating the evaporator and condenser; and controlling the flow rate of the solvent around the closed loop including recirculating a quantity of solvent, tapped from a point in the closed loop between the extraction vessel and the compressor, to the extraction vessel for further contact with the biomass; and controlling one or more modifiable resistances to solvent flow in the closed loop.

17. A method according to claim 16 wherein the step of recirculating a quantity of solvent includes pumping the quantity around a recirculation loop and through a packed bed of biomass so that the solvent contacts the biomass.

18. A method according to claim 16 wherein the step of controlling one or more modifiable resistances includes adjusting an adjustable flow control valve.

19. A method according to claim 16 wherein the step of controlling one or more modifiable resistances includes installation of an orifice plate assembly or a plurality of such plates in series.

20. A method according to claim 16 wherein the step of controlling one or more modifiable resistances includes changing an orifice constituting part of an orifice plate assembly.

21. Biomass extract obtained from the method of claim 16.

* * * * *